Figure 1:
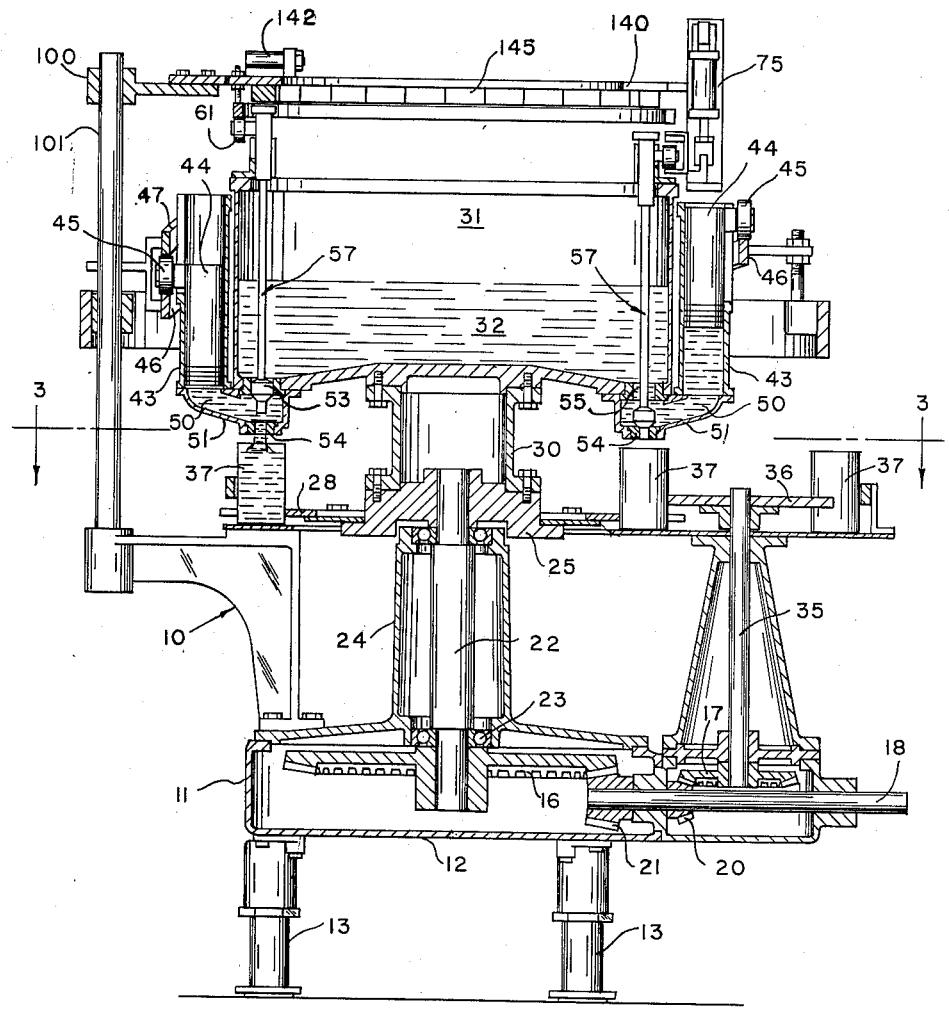

July 16, 1963

E. S. MINARD 3,097,672

MAGNETIC VALVE CONTROL MECHANISM FOR
RECEPTACLE FILLING MACHINES

Filed June 30, 1960

5 Sheets-Sheet 1

FIG. I

INVENTOR.
EVERETT S. MINARD
BY
ATTORNEY

July 16, 1963
E. S. MINARD
3,097,672
MAGNETIC VALVE CONTROL MECHANISM FOR
RECEPTACLE FILLING MACHINES
Filed June 30, 1960
5 Sheets-Sheet 2
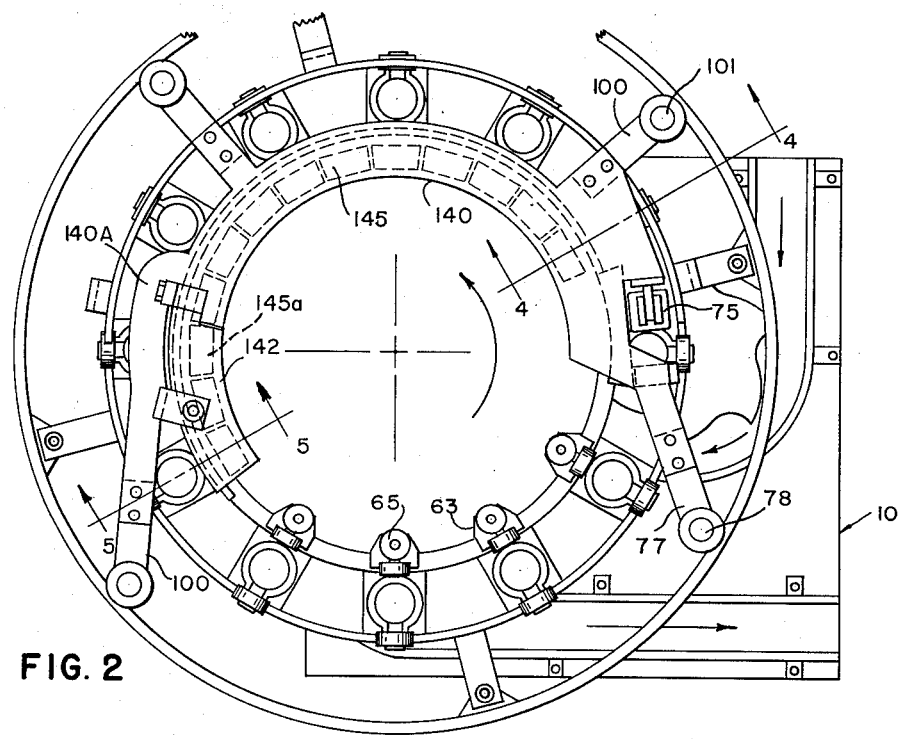
FIG. 2
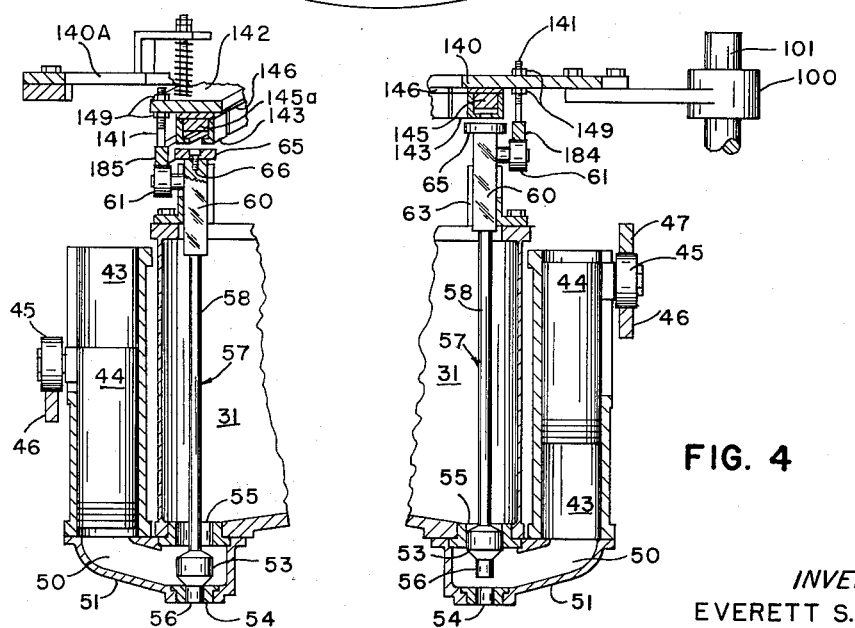
FIG. 5
FIG. 4
INVENTOR
EVERETT S. MINARD
BY
ATTORNEY

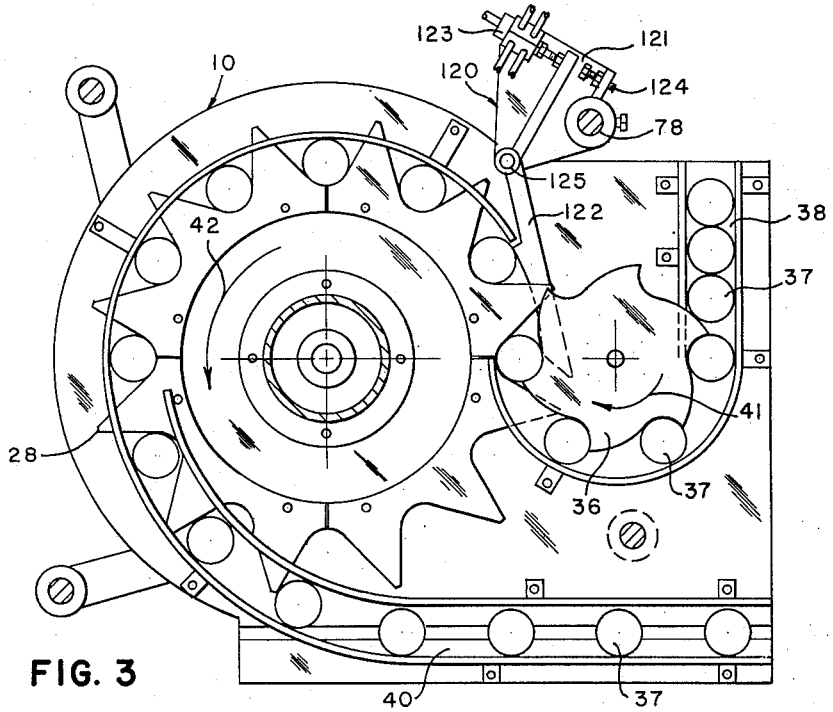
FIG. 3
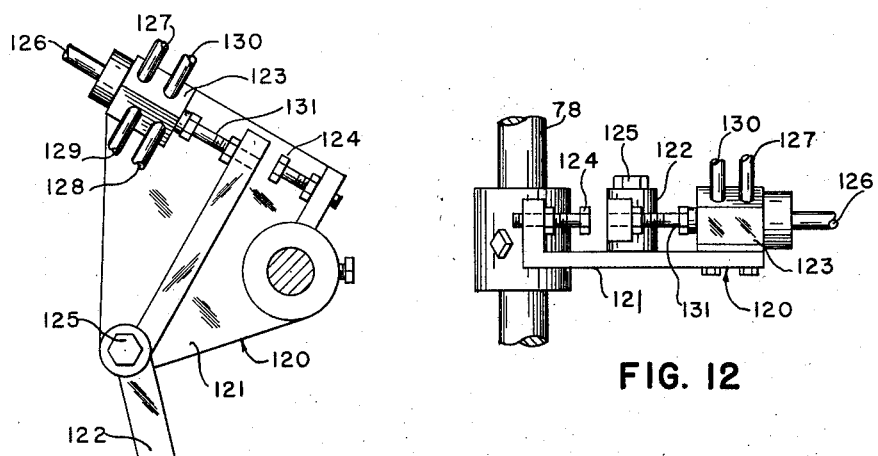
FIG. 11
FIG. 12
INVENTOR
EVERETT S. MINARD
BY 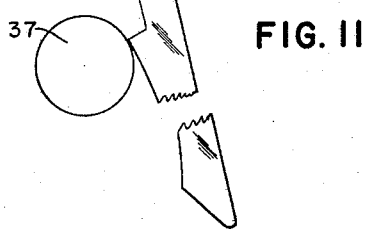
ATTORNEY July 16, 1963

E. S. MINARD 3,097,672

MAGNETIC VALVE CONTROL MECHANISM FOR
RECEPTACLE FILLING MACHINES

Filed June 30, 1960

5 Sheets-Sheet 5

*INVENTOR*
EVERETT S. MINARD

BY

*ATTORNEY*

United States Patent Office 3,097,672
Patented July 16, 1963

3,097,672
MAGNETIC VALVE CONTROL MECHANISM FOR RECEPTACLE FILLING MACHINES
Everett S. Minard, Laguna Beach, Calif., assignor to Chemetron Corporation, Chicago, Ill., a corporation of Delaware
Filed June 30, 1960, Ser. No. 39,887
10 Claims. (Cl. 141—142)

This invention relates generally to receptacle filling machines and more particularly to a novel magnetic valve control mechanism for insuring the automatic operation of filling control valves in proper timed sequence and for preventing operation of the valves except when containers to be filled are in place at the particular filling station being controlled.

This invention is an improvement on the subject matter of co-pending application, Serial No. 795,711, filed February 26, 1959, by William J. Albrecht and myself for Valve Control Mechanism for Receptacle Filling Machines, reference to which is hereby made. Although the valve control mechanism of the present invention is described herein as utilized in connection with a piston-type rotary filling machine, it will be appreciated by those familiar with the art that this mechanism can be utilized to advantage upon other types of filling machines such as gravity fill and pocket fill types of machines.

The friction type holding valve described in the above referred to co-pending application is satisfactory even after extensive use, however, every friction type mechanism or clutch ultimately reaches the point where continuing wear will result in slipping. Such a condition can result in serious diminution in product segregated for supply to containers associated with the slipping valve. Thus, unless the faulty valves are replaced, each cycle of operation may produce some containers charged with less than the full amount of product sought. Slipping in this application refers to values not being frictionally held open long enough for the material supplied from the reservoir to fill the passageways individual to the containers, and which determines the exact portion of product material allotted to each container.

It is therefore the principal object of this invention to provide a magnetic valve control apparatus or "Magnetic Monitor" for a rotary type filler which will by attraction hold and position a reciprocable fill control valve associated with each of a plurality of filling stations to positively open the valve when an empty container is disposed at the filling station to insure that the container will be filled to the proper level.

It is another object of this invention to provide a magnetic valve control apparatus which will magnetically control the depression of the fill control valve at a gradual rate to close the valve when the product segregated in the particular passageway individual to the container has been dispensed into the container.

Another object of the invention is to provide a valve control mechanism which will recognize the condition when an empty container is not present at a particular filling station usually due to failure of the supply of empty containers, thus preventing the magnetic valve control apparatus from holding the fill control valve open at an undesired time.

A further object is to provide a valve control apparatus that is entirely foolproof in that provision is made for accommodating sticking valves, as may from time to time occur, the arrangement being such that a sticking valve will be readily compensated for and will not cause damage to the valve control mechanism, the magnetic valve control apparatus or other portions of the filling machine.

Still another object is to provide a magnetic valve control apparatus which is relatively easy to disassemble for cleaning purposes and which is simple to manufacture and maintain in service.

Figure 6:
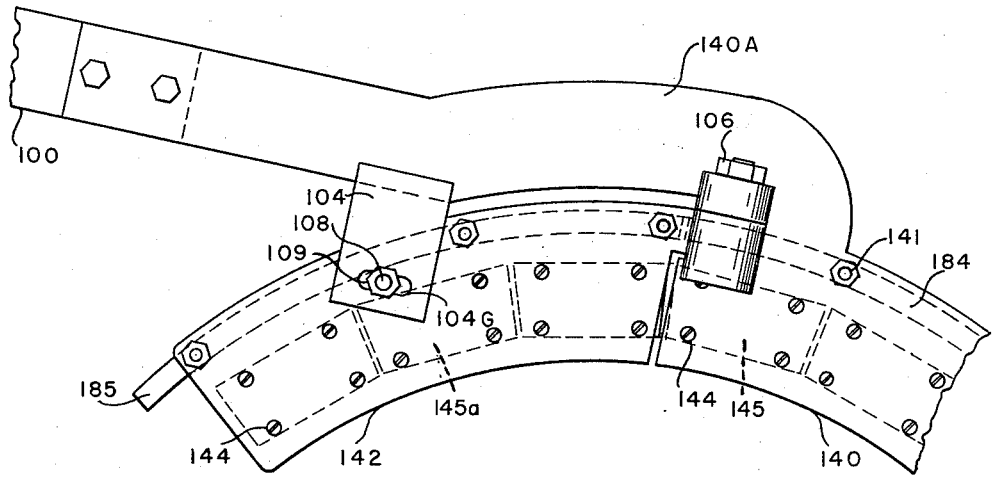
Figure 7:
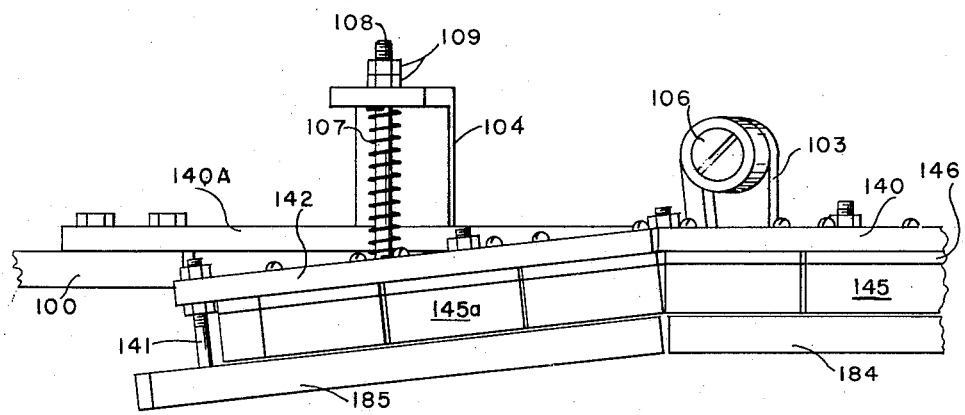
Figure 8:
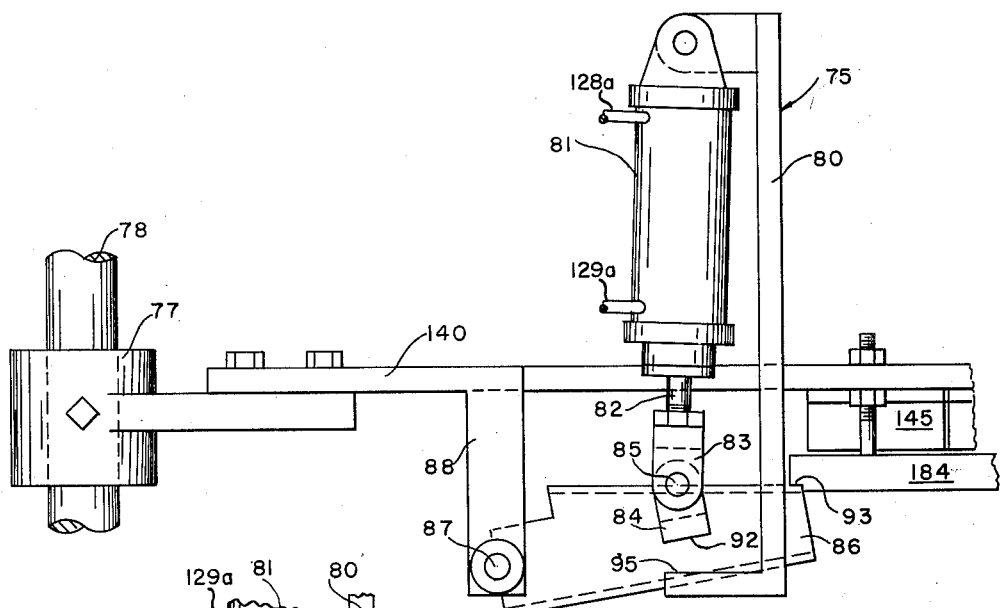
Figure 9:
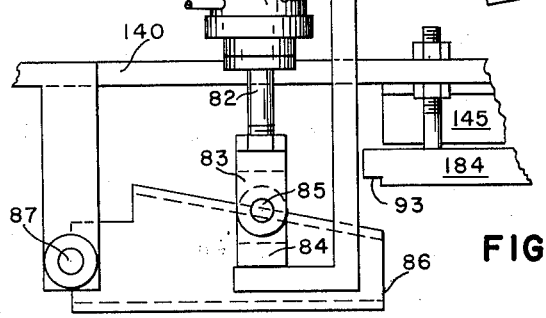
Figure 10:
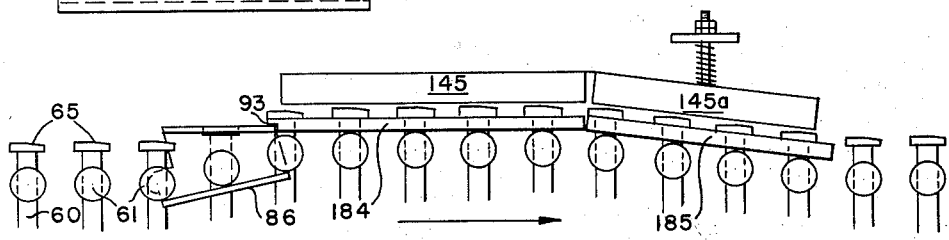
Figure 13:
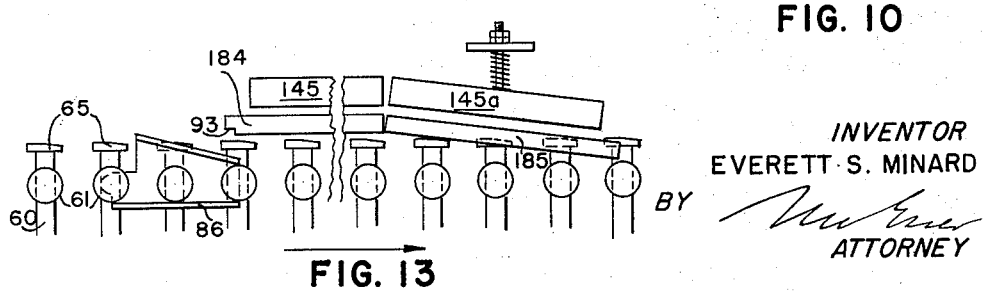

Other objects and advantages of this invention will become apparent as the following description proceeds taken in conjunction with the accompanying drawings in which:

FIG. 1 is a sectional view of the rotary piston type filler equipped with a magnetic valve control apparatus according to this invention;
FIG. 2 is a plan view of the filler of FIG. 1;
FIG. 3 is a section taken on line 3—3 of FIG. 1;
FIG. 4 is an enlarged sectional view taken along line 4—4 of FIG. 2 showing in greater detail the filler valve just opened and the piston starting down;
FIG. 5 is an enlarged section taken along line 5—5 of FIG. 2 showing in greater detail the valve just closed and the piston ready to raise;
FIG. 6 is a plan view of the closing magnet assembly, and a cut-away plan view of the holding magnet assembly;
FIG. 7 is an elevation of the closing magnet assembly in its normal pivoted sloping position;
FIG. 8 is an enlarged elevation of the valve opening mechanism with the parts shown in position to move the valve control rollers to the open position of the valve;
FIG. 9 is a view similar to FIG. 8 but with the mechanism shown in position to insure against movement of the valves to open position;
FIG. 10 is a schematic arrangement of the valve control operation through a complete cycle for opening and closing the valves;
FIG. 11 is a plan view of the container detecting mechanism;
FIG. 12 is an elevation of the mechanism illustrated in FIG. 11; and
FIG. 13 is a schematic arrangement of the valve control operation through a complete cycle when a no container condition exists.

*General Description of the Filling Machine*

In order to appreciate the improved magnetic valve control mechanism of this invention, it is necessary first to have an understanding of a typical rotary filler representative of the kind of filling machine in which such valve control mechanism may be incorporated.

As seen in FIGS. 1 and 2 the filling machine 10 consists of a stationary base assembly 11 comprising a gear case 12 supported on legs 13 and containing drive gears 16 and 17. These gears are in turn driven by drive shaft 18 through bevel gears 20 and 21. The drive gear 16 drives vertical shaft 22 journalled in suitable bearings 23 carried by cover element 24. The upper end of shaft 22 rotatably supports member 25 to which is attached a container conveying star wheel 28 and reservoir supporting pedestal 30. At the upper end of pedestal 30 there is provided a reservoir 31 for receiving the product 32 to be filled.

Shaft 35 driven by gear 17 drives a star wheel 36, the purpose of which is to feed containers from the infeed conveyor 38 (FIG. 3) into main container conveying star wheel 28. The containers 37, best seen in FIGS. 1 and 3, are carried around the filler 10 by the main conveying star wheel 28 and leave by exit conveyor 40. In FIG. 3 arrows 41 and 42 indicate the directions of rotation of the stars 36 and 28 respectively.

Reservoir 31 is provided with a plurality of filling station cylinders 43 disposed about its circumference. Each cylinder 43 is provided with a reciprocable piston 44 for the purpose of pumping the product 32 to be filled from reservoir 31 into containers 37. For this purpose, pistons 44 are reciprocated once each revolution of the reservoir 31 by interaction of rollers 45 and cam rails 46 and 47. Rail 46 is essentially circular and describes a full circle with a high point shown disposed on the right hand side of FIG. 1 and a low point at the left hand side. Rail 47 describes substantially a semicircle, the latter operating to force the rollers 45 downwardly to accomplish a downward stroke of pistons 44 during which the product is pumped from cylinders 43 into containers 37. Cam rail 46 performs the dual function of lifting the pistons 44 during one-half revolution to cause the product to be drawn into cylinders 43 and also preventing in the nature of a limiting stop too rapid and over extended downward travel of pistons 44.

The lower portion of each cylinder 43 is in communication with the interior of the reservoir 31 through passageways 50 formed in means such as castings 51 which are attached to the bottom of the reservoir 31 and support the cylinders 43. Flow of the product 32 to be filled through passageways 50 and into containers 37 is controlled by filling valves 53.

Filling Valve Action

The filling valves 53 are adapted for reciprocable movement to an uppermost position as illustrated in FIG. 4 and at the left hand side of FIG. 1, and in its lowermost position as illustrated in FIG. 5 and at the right hand side of FIG. 1. When in the raised or uppermost position, the interior of the cylinder 43 is in communication with the filling nozzle 54 as shown in FIG. 4, and product beneath the piston 44 is free to flow downwardly through passageway 50 into container 37. When the valve 53 is in its lowered position, product 32 is able to flow from reservoir 31 through port 55 and passageway 50 into the space beneath piston 44 in cylinder 43. When the valve 53 is in the lowermost position, valve extension 56 closes port 54 and prevents product from passing therethrough. It should be noted that the sides of valve 53 and the sides of extension 56 perform a guiding function in addition to their sealing functions. The length of extension 56 is such that it remains engaged in nozzle 54 until the sides of the valve member 53 are received into port 55 as the valve assembly is raised. Thus, for a short interval during movement of the valve assembly from one extreme position to another, both openings 55 and 54 are closed. However, the valve timing is so adjusted with respect to the movement of pistons 44 that the pistons are stationary during movement of the valves through the position where ports 54 and 55 are both closed. By this arrangement the lower ends of the valve assemblies 57 are always supported in proper alignment without the need for spacers or cages. Moreover, the valve extension 56 performs an additional function in that it projects all the way to the bottom of nozzle 54 in the lowermost position and effectively clears nozzle 54 of product with each reciprocation of the valve assembly 57. This facilitates delivery of accurate quantities to the individual container 37.

Filling Valve Control Mechanism

Each valve assembly 57 comprises, in addition to the valve extension 56 described above, a valve stem 58, a square shank 60, a cam roller 61 and associated pin. Mounted securely atop the square shank 60 by means such as a bolt 66 inserted within a recessed hole is a flat top valve plate 65 made of any carbon steel. The square shanks 60 of the valve assemblies 57 are slidably received in brackets 63 bolted to the top of the reservoir 31 as best shown in FIGS. 4 and 5. Each bracket 63 comprises a flange-like base portion and an upstanding portion generally in a shape complementary to shanks 60. By this arrangement the valve assembly 57 will be slidable in a longitudinal direction without rotation, as will be described later.

The valve assemblies 57 are capable of being readily disassembled for cleaning. To remove the valve assemblies one has merely to grasp each valve assembly by the top plate 65 and move it upwardly until the entire shank 60 is above the bracket 63. This frees the lower end of the assembly by withdrawing both valve 53 and valve extension 56 from port 55. To permit removal of the raised assembly 57, there is provided a slot (not shown) through the side of each bracket 63 which is wide enough to permit lateral movement of the stem 58 therethrough. The complete valve assembly may then be lifted away from the filler 10. It should be noted that certain valve assemblies pictured in FIGS. 2, 4 and 5 are not free to be lifted upwardly for removal due to the presence of the magnetic valve control structure. However, the valve assemblies as they rotate past the position shown by the valve on the left side of FIG. 2, clear the magnetic control structure and may then readily be removed as described above.

To actuate the valves from one position to another a valve raising assembly 75 (FIG. 8), a magnetic valve holding assembly (FIG. 6), and a magnetic valve closing assembly (FIGS. 6 and 7) are employed. The location of these assemblies with respect to other parts of the filler is best shown in FIG. 2.

Valve Lifting Assembly

The details of the valve lifting assembly are best shown in FIGS. 8, 9 and 10. The assembly 75 is supported on bracekt 77, adjustably supported on vertical rod 78. Bracket 77 carries plate 140 and support 80 which pivotally supports an air cylinder 81 at its upper end. The movable piston of this cylinder is attached to rod 82 which projects through the bottom of cylinder 81. The end of this rod carries a yoke 83 which is pivotally connected to a stop member 84 by pin 85. Stop member 84 is fixed to pivoted chute cam 86. The opposite end of chute cam 86 is supported by pin 87 carried by lug 88. Thus, the chute cam is movable to either the raised position shown in FIG. 8 or the lowered position showed in FIG. 9 by the action of air cylinder 81. It is to be understood that any other conventional motor means such as a solenoid may be substituted for air cylinder 81, if desired.

Chute cam 86 is U-shaped in section, the back side as shown in FIG. 8 which faces toward the reservoir 31 being open to receive the cam rollers 61 on the valve assemblies 57 as the reservoir rotates. The direction of rotation is such that the rollers approach from the left hand side as shown in FIG. 10 and enter the chute cam 86. In normal operation the rollers 61 will be in the position shown at the left of FIG. 10 as they approach the assembly 75. They are in this position when the valve assemblies are at their lowermost positions. In the event a valve assembly freezes in the raised position, its roller will also be able to enter the open end of chute cam 86. In this latter instance the air cylinder is moved upwardly together with the chute 86 to the position as seen in FIG. 8, allowing the roller to pass through in the uppermost position without damage to the equipment.

The normal position of the chute cam 86 is raised, as shown in FIGS. 8 and 10. In this position, limited by stop 93, it elevates each roller 61 and associated valve assembly 57 as the roller passes through the cam 86, the action being as shown in FIG. 10. If the air cylinder 81 is not pressurized in such manner as to raise rod 82, as is the case when the no-container-no-fill mechanism is activated, the chute cam 86 is in the position shown in FIG. 9 limited by faces 92 and 95 (FIG. 8). In such case the valve rollers 61 merely pass straight through without being raised and the filler valves remain lowered as shown is FIG. 13. This prevents the product 32 from being pumped through nozzles 54 disposed above locations on star wheel 28 where no containers are located and prevents loss of product and soiling of the machine. Moreover, as the pistons 44 are moved downwardly with the nozzles 54 closed by valve extensions 56, the product is merely pumped back into reservoir 31 through passageway 50 since the port 55 is open when nozzle 54 is closed.

If the no-container-no-fill device would pressurize the air cylinder 81 to raise the chute 86 during the time a roller is contained in the chute 86, the roller and its associated valve assembly will be pulled upwardly with the chute 86 to the raised position. The raised position of chute cam 86 is controlled by stop 93 which interacts with the end of chute 86. Another stop 92 on the bottom of yoke 84 prevents excessive downward movement by engaging face 95.

As has been described, the normal position of chute cam 86 is the raised position, and it is only when the no-container-no-fill mechanism operates that the cam 86 is lowered. Thus with proper continuous supply of containers the filler can operate all day without chute cam 86 being lowered. On the other hand, should the supply of containers fail, even momentarily, the chute cam will move to a lowered position to prevent discharge of the product from the filling station which does not contain a container. Moreover, should the control air fail, the reaction of the weight of the rollers 61 and valve 57 will lower the chute cam 86 and the device will "fail safe."

It should be noted that the left hand end of chute cam 86, as viewed in FIG. 9, is wider than the opposite end. This is done not only to facilitate entry of the rollers 61, but also to prevent damage to the valve assemblies incurred by slamming valve 53 against nozzle 54 should air cylinder 81 be actuated downwardly while a roller is within the chute cam 86. By sloping the upper face of this cam with respect to the horizontal, a roller 61 will not be moved all the way down unless it is at the extreme exit end of the cam 86 and the operation of air cylinder 81 in a properly operating machine will occur prior to the time roller 61 reaches this position.

*Magnetic Valve Control Mechanism*

The magnetic valve control mechanism describes a semi-circle about the periphery of the reservoir as viewed best in FIG. 2. The cam rail 184 is adjustably secured to the mounting plate 140 by means such as a threaded rod 141 insertable through the plate 140 and into threaded holes in the rail 184, as best viewed in FIGS. 4 and 6. Mounting plate 140 is provided with an integral extension 140a, which extends outwardly from the reservoir, at which junction point a closing magnet mounting plate 142 is pivotally secured. A pivot arm 103 extends upwardly from the mounting plate 140 which serves as a pivot support for the plate 142. The latter is attached to the pivot arm 103 by means of pivot pin 106. The movable end of the mounting plate 142 is urged downwardly by a spring 107. Spring 107 is positioned about a rod 108, which rod is secured to plate 142 at one end and through a hole 104g in the top of an inverted L-shaped piece 104 extending upwardly from and integral with the mounting plate 140a. A pair of nuts 109 are screwed onto the upper threaded end of rod 108 to act as a limit to the extent that plate 142 may be moved downwardly under the bias of spring 107, and thus the downward limiting angle of the plate 142 can be adjusted.

A short length of cam rail 185 (FIG. 7) lies as an extension of cam rail 184, an dis ararnged to pivot with the mounting plate 142, and is secured to the mounting plate by rods 141. This will be more fully explained hereinafter.

Attached to the mounting plate 140, by means of screws 144, are a plurality of holding magnets 145. The holding magnets 145 as viewed in FIGS. 4 and 5, are each enclosed by a pair of L-shaped steel plates 143. Inserted between the mounting plate 140 and the magnets 145 are insulators 146 of non-magnetic material.

Likewise, a plurality of closing magnets 145a are secured to the pivotal mounting plate 142, as illustrated in FIGS. 6 and 7.

It should be understood that the magnets 145 and 145a are permanent magnets which are preferred for convenience, and that any of a variety of such permanent magnets or permanently magnetized material may be employed. Alnico magnets for example have been found to be satisfactory in practice. It should also be understood that many electro magnetic arrangements could also be employed, but permanent magnets have proved satisfactory and preferable.

Thus, as the valve lifting assembly 75 when in the raised position lifts the valves upward, the top valve plate 65 of magnetic material is magnetically attracted to the holding magnets 145, thus maintaining the valves in their uppermost positions. It will be noted from viewing FIG. 4 that an air gap is left between the top valve plate 65 and the magnet 145. This is accomplished by the distance maintained between the mounting plate and the cam rail 184 as adjusted by the nuts 149 to the threaded rod 141. This gap prevents abrasion of the top valve plate 65 against the magnets during rotation of the valves, while sufficiently small to maintain a magnetic flux path between these elements sufficient to maintain magnetic attraction. Thus, the space between the top of the roller 61 and the top of the top valve plate 65 is slightly shorter than the distance between the bottom of the cam rail 184 and the bottom of the magnet 145, as so adjusted.

A similar gap is also maintained between the closing magnets 145a attached to closing plate 142 and the top valve plates 65. These closing magnets 145a as mentioned, are normally in a sloping position resulting from the tension of spring 107 against the pivotal mounting plate 142. Thus, after each top valve plate 65 passes the holding magnets 145 during rotation, the plate 65 is magnetically attracted by the closing magnets 145a, which hold each valve during the gradual travel down the sloping magnetic path. Thus, the closing magnets 145a act as a positive valve lowering mechanism.

It should be understood, however, that in actuality the rollers 61 of each valve are following a path controlled by the cam rail 184 and the magnets 145 attract the valve plates 65 to prevent the valves from falling to their lowermost position by gravity. This is important, since by this means the valves are maintained open so that the filling valves 53 have port 55 closed and the ports 54 open a predetermined length of time to insure proper filling of each container. Likewise, the rollers 61 following a sloping path of rail 185, gradually close the valves 53 whereby ports 55 are gradually opened and ports 54 are closed to permit flow of the product-to-be-filled into the cylinder 43.

Should a valve be encountered which is mechanically jammed in the raised position so that it will not move readily to the lowered position, the force of spring 107 is overcome by the valve roller 61 and the entire plate assembly 142 will pivot to an upper position, by the action of the roller 61 against the lower surface of the cam rail 185. A switch (not shown) may be connected into the drive motor control circuit to stop the drive motor (not shown) and apply a mechanical brake when the pivotal plate assembly rises sufficiently to engage this switch. The mechanical brake will bring the filler to a coasting stop in less than a half revolution of the reservoir.

On the other hand, if a valve is in the lowered position as it approaches the magnetic closing device, which occurs when a no-can-no-feed situation arises, it will merely pass well beneath the closing magnets 145a.

*Container Detecting Mechanism*

The container detecting mechanism 120 is located directly beneath the valve lifting assembly 75 on the level of star wheels 28 and 36. This mechanism 120 is best shown in FIGS. 3, 11, and 12. It comprises a mounting plate 121, container detecting arm 122, control valve 123, and limit stop 124. The container detecting arm 122 is a unitary lever pivoted about pin 125, having an elongated container engaging end and an opposite end which actuates valve 123. The length of the container engaging end is such it reaches from one container 37 in star wheel 28 to contact the next container just entering from star wheel 36. Thus as long as the supply of containers is uninterrupted, the arm 122 remains in the position illustrated. However, in the event the supply of containers is checked and a pocket of wheel 36 approaches without a container therein, the arm 122 will rotate in a clockwise direction as shown in FIGS. 3 and 11 until the valve control end of arm 122 strikes stop 124. Rotation of the arm 122 in this direction is accomplished by low pressure air at a pressure preferably of about 10 p.s.i. applied to control valve 123 through end connection 126. Control valve 123 is a conventional spool valve, having a hollow cylinder which receives a ported spool-like piston element movable to either of two positions. In one position high pressure air (preferably about 100 p.s.i.) entering control valve 123 through connection 127 is connected to outlet connection 128. In the other position of the spool the high pressure air is conducted to outlet connection 129. Connection 130 is an exhaust line connection, and the internal construction of the spool-like cylinder is such that when 127 is connected to 128, connections 129 and 130 are connected. Conversely, with the piston in the other position, 127 and 129 are connected and connection 128 is connected to the exhaust connection 130.

Conduits 128a and 129a, respectively, extend from connections 128 and 129 to opposite ends of air cylinder 81 in the valve lifting assembly, and thus, according to the position of control valve 123, the cylinder 81 is actuated either to move the chute cam 86 to the raised position of FIG. 8 or the lowered position of FIG. 9. By appropriate connections the chute cam 86 is moved up when arm 122 detects containers 37 in wheel 28 and down when a container is not present. Summarizing, if containers 37 are present in wheel 28 they hold arm 22 in one position, whereby high pressure air is directed by valve 123 to one side of the air cylinder 81. However, with no containers present the 10 p.s.i. air moves the spool-like piston element in valve 123 to a second position, thereby directing high pressure air to the other side of the air cylinder 81. Thus, the associated filling valve assembly 57 corresponding to a particular pocket of wheel 28 is not raised if a container is not present in such pocket, for the cam roller 61 of that valve will not be elevated by valve raising assembly 75. Moreover, if the roller 61 has been partially raised due to partial passage through chute cam 86 at the time when control valve 123 is actuated, the cylinder 81 will have its air supply reversed and will drive chute cam 86 downwardly carrying roller 61 with it to the lowered valve position. Thus, the top valve plate 65 of this valve will not come into attraction with the holding magnets 145.

As is shown in FIG. 12 a piston rod 131 extends outwardly from the end of valve 123 and engages the end of arm 122. This rod 131 is attached to the spool-like piston (not shown) within valve 132 and transmits the pressure of low pressure air from line 126 applied to the end of the spool-like piston to arm 122. Thus arm 122 is continually biased toward containers 37 and will move readily in a clockwise direction when free to do so as is the case when a pocket of star wheel 28 is empty.

*The Operation*

The operation of the individual assemblies has been outlined in considerable detail above. It is helpful, however, in order to have a clear understanding of the invention to set forth the overall operation of the filling machine and the various assemblies, particularly in the event of certain malfunctioning of the filler.

Assuming the filling machine has been in operation with a full supply of both containers 37 and product 32, the individual pistons 44 reciprocate once each revolution of the reservoir 31 and with each reciprocation pump a measured volume of product 32 into the waiting containers 37 which are supplied to the pockets of star wheel 28 beneath filling nozzles 54. The desired pumping action is achieved by reciprocating each valve assembly 57 in timed sequence with the pistons 44 so that just as each piston 44 is about to start its downward stroke the associated valve assembly is lifted to the raised position, closing port 55 leading to reservoir 31 and opening nozzle 54 to permit discharge from cylinder 43 into waiting container 37. The lifting of the valve assemblies 57 will occur at the proper time because chute cam 86 is in the raised position, container being detected by arm 122 which controls the supply of high pressure air to cylinder 81 operating the chute cam 86. The chute cam 86 will then feed the valve assemblies 57 to the holding magnets 145 where each valve will be held up the predetermined required time, as previously described.

As each piston 44 completes its downward stroke, the associated valve assembly 57 is lowered by the positive action of the closing magnets 145a, being fed thereto from the holding magnets 145. The associated nozzle 54 is thus closed by valve extension 56. At the same time, port 55 leading to reservoir 31 is opened so that a measured quantity of product 32 may flow into the space beneath piston 44 as the piston is raised. During the time the piston 44 is being raised the filled container 37 leaves star wheel 28 by conveyor 40 and is replaced by an empty container 37 fed into star wheel 28 from feed star 36. Since the presence of this container is detected by arm 122 the control valve 123 is not moved and the operation continues as described.

Assume, however, that an empty container is not supplied to a pocket of star wheel 28. Immediately arm 122 moves in a clockwise direction and moves control valve 123 to reverse the air connections to air cylinder 81. The piston of this cylinder 81 is then driven downwardly carrying cam chute 86 with it, and thereby the roller 61 associated with the valve assembly 57 disposed above the vacant pocket in star wheel 28 is not raised. When this roller remains down, the valve assembly 57 remains lowered and is unaffected by the magnetic attraction of the holding magnets 145 since it is out of its flux field or range of attraction. The nozzle 54 thus continues to be closed. As piston 44 moves down, the product beneath it is simply pumped back into reservoir 31 through passageway 50 and port 55 and is not discharged into the vacant pocket. When the valve assembly 57 which has not been raised reaches the closing magnets 145a, being already in the lowered position, no action occurs and the product to be filled may be drawn into cylinder 43 by action of piston 44. When valve assembly 57 again reaches the valve raising mechanism 75, if a container 37 is still not present in the associated pocket of wheel 28, the action will be repeated. On the other hand, if a container is present in the pocket, its presence will be detected by arm 122, chute cam 86 will be raised and normal operation will be resumed.

Should the filling machine be operating normally and a valve assembly 57 should become jammed or stuck in the lowered position, product will not flow out through nozzle 54 so long as the valve assembly remains lowered. The closing magnets 145a will have no effect since the valve is lowered. The valve raising mechanism 75 will attempt to raise the valve through the action of chute cam 86 but may not exert sufficient force to do so. In such event the only consequence will be compression of air in air cylinder 81 as the chute cam is pulled downwardly against the air pressure, and this will not result in damage to the filler.

If a valve should stick in a raised position as would be the case if a particle of metal were jammed in nozzle 54, the associated roller will enter the upper portion of chute cam 86 and the top plate 65 of the valve 57 will be magnetically attracted to the holding magnets 145. As the roller 61 engages the cam rail 185 the entire magnetic closing assembly will pivot upwardly approximately parallel with the holding assembly to prevent frictional rubbing of the roller 61 with the rail 185 as well as prevent any actual engagement between the valve and the closing magnets 145a. Thus, damage to the valve assembly and the closing magnet assembly is prevented, as well as damage in any manner to the filling machine.

The above action of the apparatus when a valve is stuck in a partly raised position would also hold true, except that the valves may not be under the direct influence of the magnets. However, as the roller approaches the cam rail 185 commensurate with the height entering, the magnetic closing assembly will pivot at this point of contact.

From the foregoing it will be obvious that a greatly improved valve control mechanism for rotary filling machines has been provided, which mechanism is foolproof in operation even at very high filling speeds, is simply constructed, and otherwise fulfills the objects of this invention.

It should be understood that without departing from the scope of this invention, the upper top plates 65 of the valves 57 could comprise magnets and be attracted to a metal rail of magnetic material upon being raised by the lifting assembly. This would have substantially the same effect as the arrangement described in this invention.

Various additional changes and modifications will suggest themselves to those familiar with the art and all such as do not depart from the spirit of this invention, are intended to fall within its scope as best defined in the following claims.

I claim:

1. A rotary filling machine having a plurality of filling assemblies overlying and movable along a path in synchronism with a plurality of container receiving pockets, comprising a common reservoir having a port for dispensing material; means associated with each of said filling assemblies for automatically flowing a measured quantity of material into a container located beneath its corresponding filling assembly comprising an outlet, a filler control valve reciprocable between two positions, a path communicating with said reservoir through said port and with said outlet; each said filler control valve having an upper magnetically attracted surface, a plurality of stationary holding magnets arranged to magnetically attract the upper surface of said filler control valves to provide a travel path for said valves upon said valves reaching a first position and to magnetically maintain said position during travel over said travel path, a plurality of closing magnets adjacent said holding magnets arranged to magnetically attract the upper surface of said filler control valve and provide a magnetic sloping travel path therefor, whereby said filler control valve assumes a second position at the termination of the travel, said first position of each said filler control valve opening said outlet and closing said port for the path communicating with said reservoir, and said second position of each filler control valve closing said outlet and opening said port for the path communicating with said reservoir, and means normally controlling an inclined travel path of each valve from said second position to said first position responsive to the receipt of a container into a pocket associated therewith.

2. A rotary filling machine as claimed in claim 1, including means for insuring a magnetic air gap between said magnets and said upper surface of said filler control valve to prevent engagement therebetween during travel of said valve.

3. A rotary filling machine having a plurality of filling assemblies overlying and movable along a path in synchronism with a plurality of container receiving pockets, comprising a common reservoir for material; means associated with each of said filling assemblies for automatically flowing a measured quantity of material into a container located beneath its corresponding filling assembly comprising an outlet, a filler control valve reciprocable between two positions, a path communicating with said reservoir through said port and with said outlet; magnetic means in fixed relation to said filling machine for magnetically holding each of said valves at a first position during valve movement along a path a first predetermined time, and holding the valve from slipping while traversing a sloping path a second predetermined time until said valve reaches a second position, said valve being in an open condition when at said first position and in a closed condition when at said second position, and means responsive only to a container in said pocket corresponding to a filler valve for effectively permitting that filler valve to move to said first position and there be magnetically held by said magnetic means.

4. A rotary filling machine having a plurality of filling assemblies overlying and movable along a path in synchronism with a plurality of container receiving pockets, comprising a common reservoir for material; means associated with each of said filling assemblies for automatically flowing a measured quantity of material into a container located beneath its corresponding filling assembly comprising an outlet, a filler control valve reciprocable between two positions, a path communicating with said reservoir through said port and with said outlet; each said filler control valve including a cam follower connected thereto, surface means in the path of said cam follower for guiding said control valve in a first position, magnetic holding means in fixed relation to said filling machine for magnetically holding said filler control valve in a second position during valve movement along a path, a movable camming surface in the path of said cam follower for effecting an inclined movement of each said control valve from said first position to said second position, detection means for determining the presence or absence of an individual empty container beneath the outlet of a particular filling assembly, and means normally responsive to said detection means detecting a container beneath said particular outlet for maintaining said movable cam in said inclined position to permit said control valve to be held by said magnetic holding means, and for moving said movable cam surface to a position relative to said first position to prevent control of said control valve by said magnetic holding means only at such time as no container is disposed beneath said outlet for maintaining the outlet of the particular filling assembly closed while opening the reservoir.

5. In a rotary filler adapted to receive a line of containers and to fill same while they are conducted around a circular path, said filler having a plurality of rotating filling assemblies traveling in a circular path, each filling assembly comprising a control valve for controlling the flow of material into the containers, each of said valves having a first closed position and a second open position, the improvement comprising, a plurality of magnets, a magnetically attractable surface portion on each said valve, said magnets being mounted in fixed relation to said filler and disposed in an arc adjacent a corresponding portion of the rotary path of said valves, and said magnetically attractable surface portion of each valve being magnetically attracted by said magnets for a predetermined time in said second open position of said valves responsive to the magnetic field of said magnets.

6. A filling machine having a plurality of filling assemblies underlying and movable along a path in synchronism with a plurality of container receiving pockets, comprising means forming a common reservoir for material to be filled and having a port, means associated with each of said filling assemblies forming a path in communication with said reservoir port having an outlet, a filler control valve movable between a first position and a second position to close said port or said outlet while moving along the path of its associated filling assembly, said outlet being closed and said port being open when said valve is in its first position, and said port being closed and said outlet being open when said valve is in its second position, means for discharging a measured quantity of material into a container beneath its associated filling assembly outlet; a cam follower connected to each said filler control valve; a movable camming surface inclined in the path of said cam follower for engaging said cam follower to guide said filler control valve from said first position to said second position, a stationary surface for engaging said cam follower in guiding said valve as it moves along the path of its associated filling assembly in said second position, magnetic means associated with said stationary surface and said movable filler control valve arranged to provide relative magnetic attraction between the two when said filler control valve is moving in said second position and adapted to positively maintain the movement of said valve in said second position for a preselected period of time, a second movable camming means for camming said filler control valve back to said first position, and additional magnetic means arranged to provide relative magnetic attraction between said second movable camming means and said filler control valve to positively guide the return of said filler control valve to said first position.

7. In a filling machine adapted to receive a line of containers and to fill same while they are conducted along a path beneath a corresponding plurality of filling assemblies traveling said path, each filling assembly comprising a control valve and a cam roller attached thereto for moving said control valve from a lower closed position to an upper open position to control the flow of material into the containers, said cam rollers normally rolling on guide rails and cams, the improvement comprising means for maintaining each said control valve in its upper open position while it moves along said path until the container is completely full, said means including a magnet fixedly mounted relative to said filling machine adjacent the path of said control valve and a cooperating magnetic material element forming part of said control valve.

8. A filling machine as claimed in claim 6, which includes means responsive to absence of a container beneath its associated outlet to move said movable camming surface so that it engages said cam follower to maintain said filler control valve in its first position preventing effective magnetic attraction between said filler control valve and said stationary surface.

9. A rotary filling machine having a plurality of filling assemblies overlying and movable along a path in synchronism with a plurality of container receiving pockets, comprising a common reservoir for material: means associated with each of said filling assemblies for automatically flowing a measured quantity of material into a container located beneath its corresponding filling assembly comprising an outlet, a filler control valve reciprocable between two positions, a path communicating with said reservoir through said port and with said outlet; each said filler control valve including a cam follower connected thereto, surface means in the path of said cam follower for guiding said control valve in a first position, magnetic holding means in fixed relation to said filling machine for magnetically holding said filler control valve in a second position during valve movement along a path, a movable camming surface in the path of said cam follower for guiding each said control valve along an inclined travel path from said first position to said second position, a magnetic closing means pivotally connected to said magnetic holding means for magnetically controlling a declining travel path of said control valves from said second position to said first position, said magnetic closing means being pivotally movable to prevent damage to a control valve due to said control valve being jammed in said second position, detection means for determining the presence or absence of an individual empty container beneath the outlet of a particular filling assembly, and means normally responsive to detection by said detection means of a container beneath said particular outlet for maintaining said movable cam in said inclined position to permit said control valve to be held open by said magnetic holding means, and for moving said movable cam surface to a position relative to said first position preventing control of said control valve by said magnetic holding means only at such time as no container is disposed beneath said outlet thereby to maintain the outlet of the particular filling assembly closed.

10. In a rotary filler adapted to receive a line of containers and to fill same while they are conducted around a circular path, said filler having a plurality of rotating filling assemblies traveling in a circular path, each filling assembly comprising a control valve for controlling the flow of material into the containers, each of said valves having a first closed position and a second open position, the improvement comprising, a first plurality of magnets, a magnetically attractable surface portion on each said valve, said first plurality of magnets being mounted in fixed relation to said filler and disposed in an arc adjacent a corresponding portion of the rotary path of said valves, and said magnetically attractable surface portion of each valve being magnetically attracted by said first plurality of magnets for a predetermined time in said second open position of said valves responsive to the magnetic field of said first plurality of magnets, a second plurality of magnets disposed in an arc adjacent a second corresponding portion of the rotary path of said valves, and said magnetically attractable surface portion of each valve being magnetically attracted to said second plurality of magnets for a predetermined time to prevent slipping of the valves during a return movement of said valves to said first closed portion of said valves responsive to the magnetic field of said second plurality of magnets.

References Cited in the file of this patent

UNITED STATES PATENTS

| | | |
|---|---|---|
| 1,726,297 | Hansen | Aug. 27, 1929 |
| 2,115,335 | Keck et al. | Apr. 26, 1938 |
| 2,156,951 | Mondloch | May 2, 1939 |
| 2,248,798 | Wittmann | July 8, 1941 |
| 2,551,033 | McGihon | May 1, 1951 |
| 2,655,248 | Buccione | Oct. 13, 1953 |
| 2,960,319 | Carvallo | Nov. 15, 1960 |